US011226613B2

(12) United States Patent
Ootomo

(10) Patent No.: US 11,226,613 B2
(45) Date of Patent: Jan. 18, 2022

(54) ANOMALY DETECTION DEVICE, ANOMALY DETECTION SERVER AND ANOMALY DETECTION METHOD

(71) Applicant: FANUC CORPORATION, Yamanashi (JP)

(72) Inventor: Yousuke Ootomo, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 31 days.

(21) Appl. No.: 16/855,404

(22) Filed: Apr. 22, 2020

(65) Prior Publication Data
US 2020/0371500 A1 Nov. 26, 2020

(51) Int. Cl.
G05B 19/418 (2006.01)
G05B 19/18 (2006.01)

(52) U.S. Cl.
CPC ....... *G05B 19/4184* (2013.01); *G05B 19/182* (2013.01); *G05B 19/4183* (2013.01)

(58) Field of Classification Search
CPC .............. G05B 19/4184; G05B 19/182; G05B 19/4183; G05B 19/406; G05B 19/4065; G05B 2219/37616
See application file for complete search history.

(56) References Cited

U.S. PATENT DOCUMENTS

| 2003/0023336 | A1* | 1/2003 | Kreidler | G05B 19/4183 700/108 |
| 2003/0163286 | A1* | 8/2003 | Yasugi | G05B 19/4065 702/185 |
| 2012/0109539 | A1* | 5/2012 | Hasegawa | G05B 19/4065 702/34 |
| 2017/0297199 | A1* | 10/2017 | Suzuki | G05B 19/406 |

FOREIGN PATENT DOCUMENTS

JP 7-132440 5/1995

* cited by examiner

Primary Examiner — Christopher E. Everett
(74) Attorney, Agent, or Firm — Wenderoth, Lind & Ponack, L.L.P.

(57) ABSTRACT

An anomaly detection device includes: a machining state collection unit which collects machining execution information at a predetermined time interval; a machining execution information recording unit which records the collected machining execution information in a storage unit; a selection unit which selects, from a set of a plurality of pieces of machining execution information recorded by executing a machining command a plurality of times, a subset of the machining execution information in order to calculate an average pattern according to a machining step which is an analysis target; an average pattern calculation unit which calculates the average pattern corresponding to the machining step of the analysis target based on the subset; and an anomaly detection unit which compares the machining execution information in the machining step of the analysis target with the average pattern to detect whether or not an anomaly occurs in the machining step of the analysis target.

7 Claims, 9 Drawing Sheets

FIG. 3A

◆FIRST TO NTH MACHINING STEPS
☐MACHINING STEP NUMBER
☐MACHINING STEP START DATE AND TIME
☐MACHINING STEP COMPLETION DATE AND TIME
☐TOOL NUMBER
☐MACHINING SHAPE
☐MACHINING FEATURE
☐MATERIAL OF MACHINED WORK PIECE
☐CUTTING CONDITIONS
☐STRATEGY
☐APPROACH METHOD
☐RETRACT METHOD
■MACHINING REQUIREMENT INFORMATION
・CAM TOLERANCE
・SURFACE ROUGHNESS
・GEOMETRIC TOLERANCE AND DIMENSIONAL
  TOLERANCE

FIG. 3B

MACHINING EXECUTION INFORMATION
  ◇MACHINING COMMAND NUMBER
  ◇CNC MACHINE TOOL NUMBER
  ◇MACHINING COMMAND START DATE AND TIME
  ◇MACHINING COMMAND COMPLETION DATE AND TIME
  ◇ATTACHMENT STATE OF MATERIAL TO BE CUT
  ◆FIRST MACHINING STEP
    - SERVO INFORMATION
    - VARIOUS TYPES OF SENSOR ACQUISITION INFORMATION
    - RESOURCE INFORMATION
  ⋮
  ◆NTH MACHINING STEP
    - SERVO INFORMATION
    - VARIOUS TYPES OF SENSOR ACQUISITION INFORMATION
    - RESOURCE INFORMATION

FIG. 4A

MACHINING STATE TABLE CORRESPONDING TO MACHINING STEP Cn

| SAMPLING TIME | PHYSICAL QUANTITY | TOOL USAGE STATE |
|---|---|---|
| $Tn(1)$ | $Dn(1)$ | $On(1)$ |
| $Tn(2)$ | $Dn(2)$ | $On(2)$ |
| $Tn(3)$ | $Dn(3)$ | $On(3)$ |
| * | * | * |
| * | * | * |
| * | * | * |
| $Tn(M-1)$ | $Dn(M-1)$ | $On(M-1)$ |
| $Tn(M)$ | $Dn(M)$ | $On(M)$ |

FIG. 4B

MACHINING STATE TABLE CORRESPONDING TO KTH MACHINING STEP Cn(k)

| SAMPLING TIME | PHYSICAL QUANTITY | TOOL USAGE STATE |
|---|---|---|
| $Tn(1,j)$ | $Dn(1,j)$ | $On(1,j)$ |
| $Tn(2,j)$ | $Dn(2,j)$ | $On(2,j)$ |
| $Tn(3,j)$ | $Dn(3,j)$ | $On(3,j)$ |
| * | * | * |
| * | * | * |
| * | * | * |
| $Tn((M-1),j)$ | $Dn((M-1),j)$ | $On((M-1),j)$ |
| $Tn((M),j)$ | $Dn((M),j)$ | $On((M),j)$ |

FIG. 6
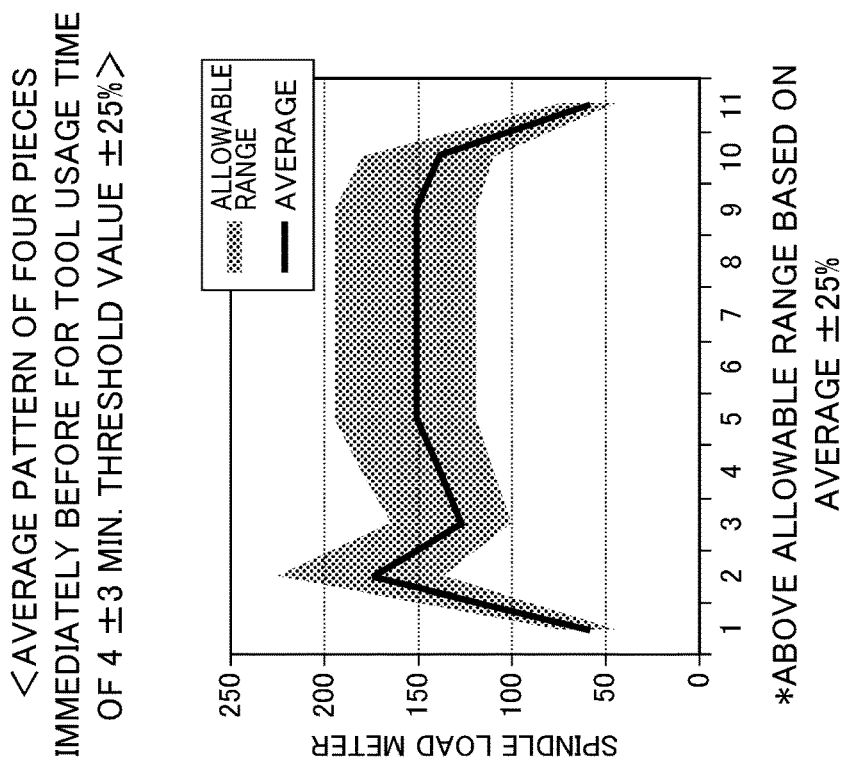
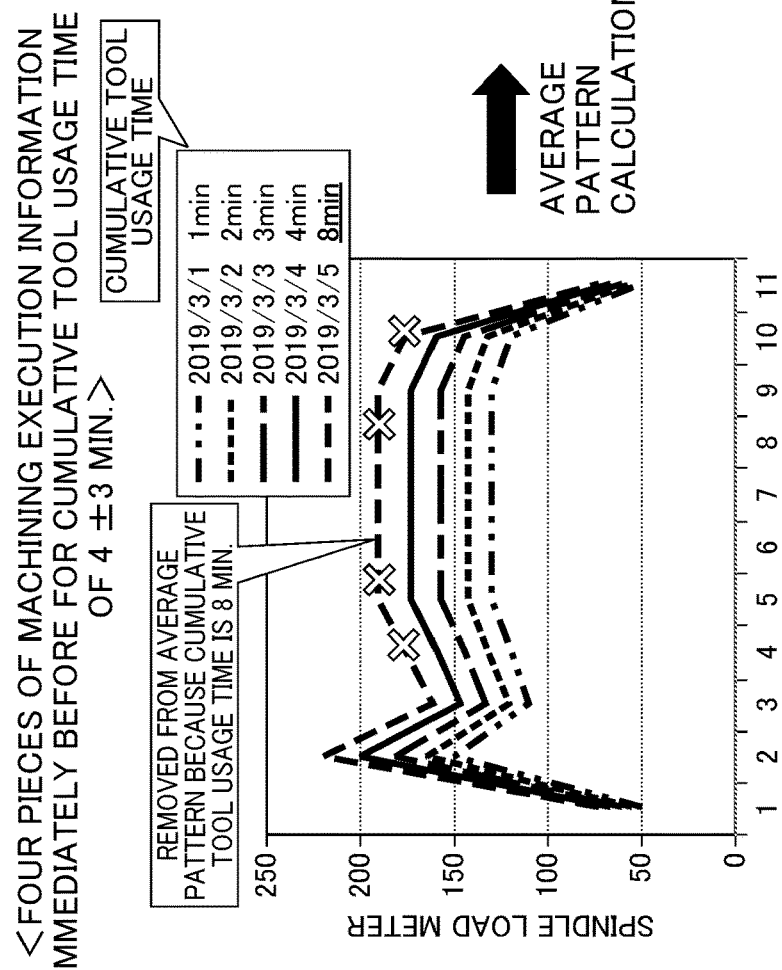

ANOMALY DETECTION DEVICE, ANOMALY DETECTION SERVER AND ANOMALY DETECTION METHOD

This application is based on and claims the benefit of priority from Japanese Patent Application. No. 2019-097421, filed on 24 May 2019, the content of which is incorporated herein by reference.

BACKGROUND OF THE INVENTION

Field of the Invention

The present invention relates to an anomaly detection device, an anomaly detection server and an anomaly detection method.

Related Art

Conventionally, even in normal machining, it often occurs that a machining load is rapidly increased or decreased during the machining. Hence, when a machining load is only displayed during machining, it is difficult to distinguish whether or not the machining anomaly occurs. For example, it is known that in a controller, a machining load torque is monitored, and that when a machining load exceeds a certain level, or a difference between the machining load and reference data exceeds a certain level, an alarm is output so as to stop the machining or to lower a cutting feed rate and thereby reduce the load. In this way, damage of a tool is prevented, and a machining failure in a work piece is also prevented. In order to perform the method of monitoring the machining load as described above, a machining load monitoring method is known in which trial cutting is previously performed on the work piece, in which data of a machining load in the trial cutting is acquired as sampling data at a regular interval, in which then in actual cutting, reference data that is the sampling data and actual measured data are compared at a regular interval and in which thus the machining load is monitored. In the conventional machining load monitoring method described above, the machining load in each round of trial cutting which is the sampling data is highly likely to be changed due to various factors such as variations in a tool and the work piece and a cutting oil in the trial cutting. Hence, when reference data is determined by one round of trial cutting, the reference data does not always indicate an accurate machining load in the cutting, with the result that it may be impossible to perform an accurate determination due to variations in the reference data for monitoring the machining load.

In this regard, Patent Document 1 discloses a machining load monitoring method for monitoring a machining load of a machine tool in which the reference data of the machining load is determined from an average value in the sampling data of the machining load obtained when trial cutting performed a plurality of times, in which the dispersion thereof is determined, in which values of the dispersion are used so as to set a threshold value corresponding to variations in the sampling data, in which the reference data and the actual measured data of the machining load are compared at a regular interval, in which whether or not the difference therebetween exceeds the threshold value is detected and in which thus the machining load is monitored in the machining load monitoring method disclosed in Patent Document 1, a method of monitoring the machining load in actual cutting based on the reference data of the machining load determined from the sampling data of the machining load obtained when the trial cutting is performed a plurality of times is adopted. In other words, when the same cutting machining is performed individually and repeatedly on a plurality of work pieces, the machining load in each round of cutting machining is compared with the same reference data. However, when the same cutting machining is performed individually and repeatedly on a plurality of work pieces, it is estimated that a state (for example, the state of wear of a tool) of the machine tool when the cutting machining is performed on the first work piece and a state of the machine tool when the cutting machining is performed on the subsequent work piece after the cutting machining is repeatedly performed are not always the same as each other. Hence, although the reference data disclosed in Patent Document 1 is suitable for comparison with, for example, actual measured data obtained when the cutting machining is performed on work pieces in the beginning, it is likely that the reference data is not always suitable for comparison with the actual measured data obtained when the cutting machining is performed on the subsequent work piece after the cutting machining is repeatedly performed. In the machining load monitoring method disclosed in Patent Document 1, for example, when it is detected that the machining load exceeds the threshold value, how such an event is notified to a user is not specifically disclosed. Moreover, in the machining load monitoring method disclosed in Patent Document 1, for example, only the machining load that is estimated by an observer estimating a disturbance load torque is monitored, and the observation of other physical quantities is not disclosed. Furthermore, for example, with respect to a period for calculating the statistical value of averages, dispersion or the like, for example, regardless of conditions (for example, conditions such as a cumulative usage time of a tool, the number of times the tool is used and a cumulative actual cutting time of the tool) indicating the state of wear of the tool, the statistical value is calculated in the same manner.

Patent Document 1: Japanese Unexamined Patent Application, Publication No. H07-132440

SUMMARY OF THE INVENTION

For example, when the same machining step is performed individually and repeatedly on a plurality of work pieces, it is desired to be able to distinguish, by a method suitable for each of machining states, whether or not a machining anomaly occurs in each of the machining steps.

(1) An anomaly detection device that is one aspect of the present disclosure includes, in order to detect an anomaly in a machining command which is executed in a controller and which is formed with one or more machining steps: a machining state collection unit which collects, as machining execution information of the machining step, a physical quantity that is acquired at a predetermined time interval when the machining command is executed and that indicates a machining state in the machining step together with information of a time at which the physical quantity is acquired; a machining execution information recording unit which records, in a storage unit, the machining execution information collected with the machining state collection unit; a selection unit which executes, on an arbitrary one of the machining steps, the same machining step as the machining step a plurality of times and which selects, from a set of machining execution information of the same machining step as the machining step recorded a plurality of times in the storage unit, a subset of the machining execution information of the same machining step as the machining step that is suitable for calculation of an average pattern which is an average time change in the physical quantity of machining execution information of the arbitrary one of the machining steps; an average pattern calculation unit which calculates the average pattern of the machining execution information of the arbitrary one of the machining steps based on the subset of the machining execution information selected with the selection unit; and an anomaly detection unit which compares target machining execution information that is acquired by execution of the arbitrary one of the machining steps and that is the machining execution information of the machining step with the average pattern calculated with the average pattern calculation unit so as to detect an anomaly when the arbitrary one of the machining steps is executed.

(2) An anomaly detection server that is one aspect of the present disclosure includes the anomaly detection device described in (1), and is connected to the controller so as to communicate therewith.

(3) By an anomaly detection method that is one aspect of the present disclosure, a computer executes, in order to detect an anomaly in a machining command that is executed in a controller and that is formed with one or more machining steps: a machining state collection step of collecting, as machining execution information of the machining step, a physical quantity that is acquired at a predetermined time interval when the machining command is executed and that indicates a machining state in the machining step together with information of a time at which the physical quantity is acquired; a machining execution information recording step of recording, in a storage unit, the machining execution information collected in the machining state collection step; a selection step of executing, on an arbitrary one of the machining steps, the same machining step as the machining step a plurality of times and selecting, from a set of machining execution information of the same machining step as the machining step recorded a plurality of times in the storage unit, a subset of the machining execution information of the same machining step as the machining step that is suitable for calculation of an average pattern which is an average time change in the physical quantity of machining execution information of the arbitrary one of the machining steps; an average pattern calculation step of calculating the average pattern of the machining execution information of the arbitrary one of the machining steps based on the subset of the machining execution information selected in the selection step; and an anomaly detection step of comparing target machining execution information that is acquired by execution of the arbitrary one of the machining steps and that is the machining execution information of the machining step with the average pattern calculated in the average pattern calculation step so as to detect an anomaly when the arbitrary one of the machining steps is executed.

According to one aspect, it is possible to provide an anomaly detection device in which, for example, when the same machining step is performed individually and repeatedly on a plurality of work pieces, it is possible to distinguish, by a method suitable for each of machining states, whether or not a machining anomaly occurs in each of the machining steps.

BRIEF DESCRIPTION OF THE DRAWINGS

FIG. 3A is a diagram showing an example of details included in machining steps in the embodiment;

FIG. 3B is a diagram showing an example of details included in machining execution information in the embodiment;

FIG. 4A is a diagram showing an example of a machining state table in the embodiment;

FIG. 4B is a diagram showing an example of the machining state table in the embodiment;

FIG. 6 is a diagram showing an outline of the calculation of an average pattern by utilization of a plurality of physical quantities and machining times which satisfies a condition related to a predetermined cumulative tool usage time in the same machining step in the embodiment;

DETAILED DESCRIPTION OF THE INVENTION

An example of the embodiment of the present invention will be described below. In the present embodiment, as a controller 1 of a machine tool, a numerical controller 1 is illustrated. Although as the machine tool, for example, a 5-axis machine tool is illustrated, there is no limitation thereto. For example, a 3-axis machine tool may be adopted. Although in the present embodiment, a case where the machine tool is a cutting machine tool or a grinding machine tool is illustrated, there is no limitation thereto. For example, a physical quantity in relation to an applied voltage or current when the machine tool is an electrical discharge machine, for example, a physical quantity in relation to a user output or a water pressure when the machine tool is a laser machine tool or a water jet machine tool, for example, a physical quantity in relation to a heating temperature or an injection pressure when the machine tool is an injection molding machine and the like are individually used as machining execution information which will be described later in the individual machine tools, and thus it is possible to likewise detect whether or not an anomaly occurs when an arbitrary one of machining steps is executed.

Figure 1:
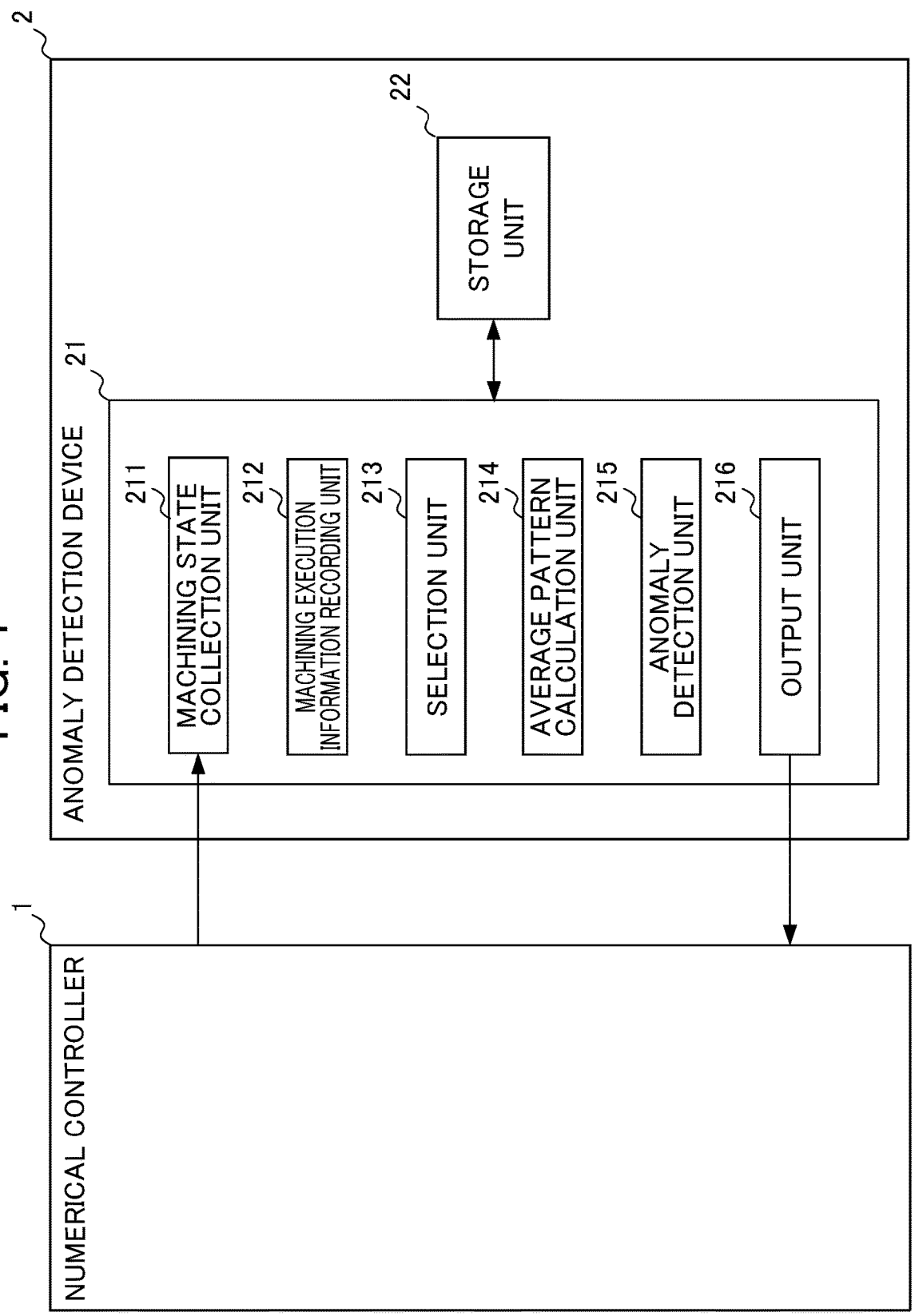
FIG. 1 is a block diagram showing the hardware configuration of main units of an anomaly detection device according to an embodiment.

A system in the present embodiment includes the numerical controller 1 and an anomaly detection device 2 as shown in FIG. 1. The anomaly detection device 2 detects, after the machining or during the machining, whether or not, in the numerical controller 1 for executing a machining command formed with one or a plurality of machining steps, an anomaly occurs when an arbitrary one of the machining steps is executed. As shown in FIG. 1, the numerical controller 1 and the anomaly detection device 2 are connected to each other. Here, as an interconnection method, the anomaly detection device 2 may be directly connected to the numerical controller 1 through an interface portion (not shown). The anomaly detection device 2 may be connected to the numerical controller 1, for example, through a network so as to communicate therewith. The anomaly detection device 2 may also be included in the numerical controller 1. Part of a functional block which will be described later included in the anomaly detection device 2 may also be included in the numerical controller 1. Before the description of the anomaly detection device 2, the numerical controller 1 will be described.

Figure 2:
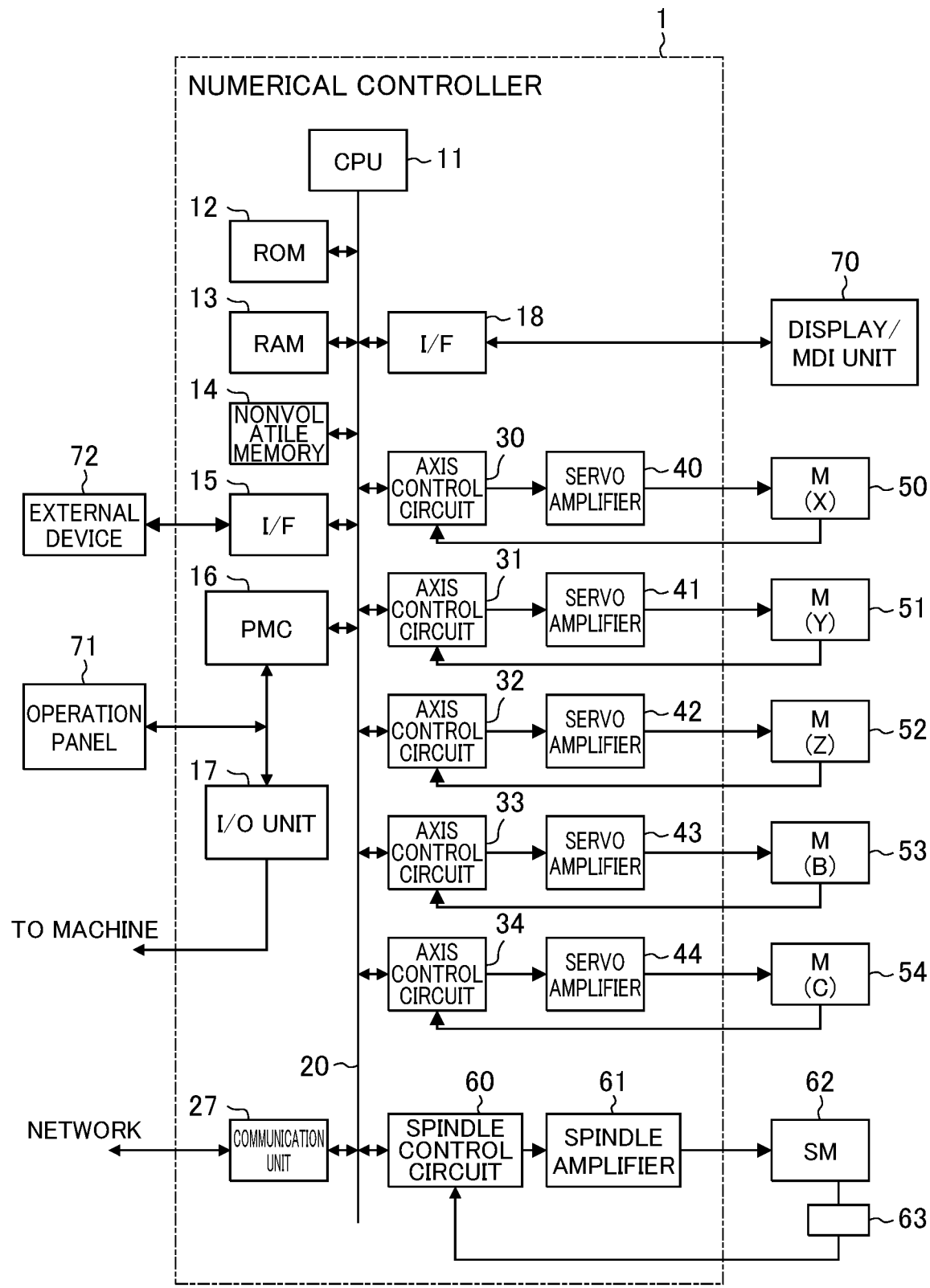
FIG. 2 is a block diagram showing the functional configuration of a numerical controller in the embodiment.

FIG. 2 is a block diagram showing the hardware configuration of main units of the numerical controller 1 in the present embodiment. In the numerical controller 1, a CPU 11 serving as a control unit is a processor which controls the entire numerical controller 1. The CPU 11 reads, through a bus 20, a system program stored in a ROM 12 serving as a storage unit so as to control the entire numerical controller 1 according to the system program. In a RAM 13 serving as the storage unit, temporary calculation data, display data and various types of data input by an operator through a display/MDT unit 70 are stored. Since access to the RAM is generally faster than access to the ROM, the CPU 11 may previously develop the system program stored in the ROM 12 on the RAM 13 and read the system program from the RAM 13 so as to execute the system program. A nonvolatile memory 14 serving as the storage unit is a magnetic storage device, a flash memory, an MRAM, an FRAM (registered trademark), an EEPROM, an SRAM or a DRAM backed up by a battery or the like, and is configured as a nonvolatile memory in which a storage state is held even when the power of the numerical controller 1 is turned off. In the nonvolatile memory 14, a machining program and the like input through an interface 15, the display/MDI unit 70 or a communication unit 27 are stored.

In the ROM 12, various types of system programs for performing processing in an edit mode necessary for production and editing of the machining program and processing for an automatic operation are previously written. Various types of machining programs are input through the interface 15, the display/MDT unit 70 or the communication unit 27 and are stored in the nonvolatile memory 14. The ROM 12, the RAM 13 and the nonvolatile memory 14 are also referred to as the storage unit. The interface 15 connects the numerical controller 1 and an external device 72 together. The machining programs, various types of parameters and the like are read from the external device 72 into the numerical controller 1. The machining program which is edited within the numerical controller 1 can be stored in an external storage means through the external device 72. Specific examples of the interface 15 can include RS232C, USB, SATA, a PC card slot, a CF card slot, an SD card slot, Ethernet (registered trademark), Wi-Fi and the like. The interface 15 may be present on the display/MDI unit 70. Examples of the external device 72 can include a computer, a USB memory a CFast, a CF card, an SD card and the like.

A PMC (Programmable Machine Controller) 16 outputs a signal with a sequence program incorporated in the numerical controller 1 through an I/O unit 17 to an auxiliary device of the machine tool (for example, an automatic tool changer including an actuator such as a robot hand for the change of a tool) so as to control the auxiliary device. The PMC 16 receives signals of various types of switches and the like in an operation panel 71 provided in the main body of the machine tool, performs necessary signal processing thereon and feeds them to the CPU 11. In general, the PMC 16 is also referred to as a PLC (Programmable Logic Controller). The operation panel 71 is connected to the PMC 16. The operation panel 71 may include a manual pulse generator and the like. The display/MDI unit 70 serving as a display unit is a manual data input device which includes a display 701 and an operation unit such as a keyboard or a touch panel 702. An interface 18 feeds screen data for display to the display 701 of the display/MDI unit 70, and receives a command and data from the operation unit of the display/MDI unit 70 and feeds them to the CPU 11.

Axis control circuits 30 to 34 for the individual axes of X, Y, Z, B and C are formed with processors, memories and the like, receive movement command amount s for the individual axes from the CPU 11 and output commands for the individual axes to servo amplifiers 40 to 44. The servo amplifiers 40 to 44 receive the commands so as to drive servo motors 50 to 54 for the individual axes of X, Y, Z, B and C. The servo motors 50 to 54 for the individual axes incorporate pulse encoders for position detection, and feed back position signals from the pulse encoders as a pulse train. As position detectors, linear scales may be used. The pulse train is subjected to F/V (frequency/velocity) conversion, and thus it is possible to generate a velocity feedback signal. Then, the position/velocity feedback signals are fed back to the axis control circuits 30 to 34, and thus position/velocity feedback control is performed with the processors.

A spindle control circuit 60 is also formed with a processor, a memory and the like, and receives a spindle rotation command from the CPU 11 so as to output a spindle velocity signal to a spindle amplifier 61. The spindle amplifier 61 receives the spindle velocity signal and rotates a spindle motor 62 at a commanded rotation velocity so as to drive the tool. A pulse encoder is coupled to the spindle motor 62 with a gear, a belt or the like, the pulse encoder 63 feeds back a feedback pulse to the spindle control circuit 60 in synchronization with the rotation of the spindle and thus the processor of the spindle control circuit 60 performs velocity control processing.

The anomaly detection device 2 detects, after the machining or during the machining, whether or not, in the numerical controller 1 for executing, a plurality of times, the machining command formed with one or a plurality of machining steps, an anomaly occurs when an arbitrary one of the machining steps is executed. Hereinafter, an arbitrary one of the machining steps that is a target on which whether or not an anomaly occurs is detected is also referred to as an "anomaly detection target machining step" or an "analysis target machining step". Hence, the anomaly detection device 2 has an anomaly detection function that includes: a function of associating, in an arbitrary one of the machining steps included in the machining command executed with the numerical controller 1, for example, a physical quantity and time information which are machining execution information acquired with a sensing means with the machining step so as to collect them; a function of collecting, for example, for a certain period, machining execution information acquired in a machining step having the same machining shape and machining method as the machining step, selecting an optimum subset from a set of the machining execution information collected individually in the machining steps and calculating an average pattern which is used for determining whether or not an anomaly occurs in the anomaly detection target machining step and which is an average time change in the physical quantity; a function of comparing the machining execution information in the anomaly detection target machining step with the average pattern of the machining step; a function of detecting whether or not the result of the comparison is separated by a predetermined threshold value or greater; a function of determining, when the result of the comparison is separated by the predetermined threshold value or greater, that a machining anomaly occurs in the machining step; and a function of identifying and displaying, when it is determined that an anomaly occurs, a region which is separated. The details of the anomaly detection function will be described later.

Before the description of the anomaly detection function, the machining shape, the machining command, the machining step and the machining execution information in the present embodiment will be described.

The machining shape refers to, for example, the shape of a machined work piece (which is also referred to as a "work piece") after the machining which is designed by a user with CAD (Computer-Aided Design).

The machining command refers to, for example, machining command information for machining, into the machining shape, the work piece which is produced by the user with CAM (Computer-Aided Manufacturing) from machining shape data designed with the CAD and the like. The machining command includes, for example, the settings of the details of the machining such as the machining shape, cutting conditions, a strategy, an approach method and a retract method. Specifically, the machining command includes, as will be described later, with the assumption that a unit for machining one type of machining shape with one type of tool is a machining step, information of one or a plurality of machining steps (information of the first machining step to the Nth (N is an arbitrary natural number) machining step).

FIG. 3A is a diagram showing an example of information related to the details of the machining included in machining steps. As described above, the machining step is the unit for machining one type of machining shape with one type of tool, and with reference to FIG. 3A, the machining step includes, for example, settings for the details of the machining such as a machining step number, a machining step start date and time, a machining step completion date and time, a tool number, the machining shape, a machining feature, the material of the machined work piece, the cutting conditions and a machining method (for example, the approach method and the retract method) and machining requirement information including a CAM tolerance, surface roughness, a geometric tolerance and a dimensional tolerance. The information related to the details of the machining is not limited thereto. For example, as the information related to the details of the machining, information such as a spindle speed, a cutting feedrate, the amount of feed per blade, a cutting depth, a cutting width and a tool path may be included. As described above, the machining command is formed with one or a plurality of machining steps, the machining shape and the machining method are described in each of the machining steps and the numerical controller 1 executes the machining command and thereby can make the machine tool perform machining processing.

FIG. 3B is a diagram showing an example of data included in the machining execution information. With reference to FIG. 3B, the machining execution information includes, for example, the machining command information, a machine tool number, a machining command start date and time and a machining command completion date and time. In each of the machining steps, the machining state at the time of execution of machining based on the machining command which is acquired (or measured) at each predetermined sampling time each time the machining command is executed with the numerical controller 1 in the machine tool and the time information at that time are included. Specifically, the machining execution information includes information related to the machining state in the machine tool obtained when the machining command is executed with the numerical controller 1 such as servo information, various types of sensor data information and resource information (such as a tool usage time). The machining execution information can be made to correspond to each of the machining steps for machining one type of machining shape with one type of tool. In this way, the same number of pieces of machining execution information as the number of times the same machining command is executed can be made to correspond to the same machining step (that is, the machining step in which the same machining shape is machined with the same tool). As described above, since the state at the time of execution of the machining is acquired at a predetermined sampling period, the machining execution information in the same machining step can be subjected to statistical processing based on the state at the time of execution of the machining at each sampling time from the start time of the machining step until the completion time thereof. The anomaly detection device 2 according to the present embodiment is assumed to select, based on the machining step serving as the anomaly detection target machining step, an appropriate subset from a plurality of pieces of machining execution information which are acquired as described above and which are made to correspond to individual executions when one machining step is executed a plurality of times, to calculate, for example, the average pattern of the machining step and to compare the average pattern with the machining execution information of the machining step obtained when the anomaly detection target machining step is executed. Hence, the average pattern of the machining step calculated with the anomaly detection device 2 is not fixed. For example, when the machining command is executed a plurality of times, the machining step included in the machining command is executed a plurality of times. In this case, the average pattern (i) calculated when the machining step (i) executed the i-th time (i>1) is set to the anomaly detection target and the average pattern (j) calculated when the machining step (j) executed the j-th time (j>i) is set to the anomaly detection target are not always the same value.

<Machining Execution Information>

An example of the machining execution information in the present embodiment will next be described. In the following description, as the physical quantities included in the machining execution information, a spindle load meter value, a spindle torque value, the servo torque values of the individual axes and the servo positions of the individual axes which are acquired with the sensing means and the resource information (such as the tool usage time) when machining is executed are illustrated.

As the spindle torque value, for example, a maximum output reference load meter value obtained by dividing an output at a certain motor speed when the machine tool is operated by the maximum output when the maximum current is supplied to the motor and/or a continuous rated output reference load meter value obtained by dividing the output by a continuous rated output capable of outputting the motor infinitely may be measured.

As the spindle torque value, for example, a disturbance estimation observer (not shown) is incorporated in the spindle control circuit 60, and thus it is possible to measure a spindle torque applied to the spindle motor 62. The measurement of the spindle torque is not limited thereto. For example, the spindle torque applied to the spindle motor 62 may be measured with a drive current flowing through the spindle motor 62. Furthermore, the spindle torque may be measured by specially adding a torque sensor.

Likewise, with respect to the servo torque values of the individual axes (the servo torques of the individual axes (the load torques of the individual axes) applied to the servo motors 50 to 52 of the X, Y and Z axes of a tool feed axis), the disturbance estimation observer (not shown) is incorporated in the axis control circuits 30 to 32 for driving and controlling the servo motors 50 to 52 of the X, Y and Z axes of the tool feed axis, and thus it is possible to measure the servo torques of the individual axes (load torques) applied by the observer to the servo motors 50 to 52. By measuring the drive currents of the servo motors of X, Y and Z axes of the tool feed axis, the servo torques of the individual axes may be estimated with the drive currents. Furthermore, by addition of torque sensors, the servo torques of the individual axes (load torques) applied to the servo motors of the individual axes may be measured.

The servo position information of the individual axes may be measured, for example, with position feedback signals from the pulse encoders incorporated in the servo motors 50 to 52 of the individual axes.

As the resource information (such as the tool usage time) when the machining is executed, the information of the tool used in each of the machining steps and the tool usage time may be measured.

<Anomaly Detection Function>

The anomaly detection function included in the anomaly detection device 2 will next be described. The anomaly detection device 2 includes a control unit 21 and a storage unit 22, and may further include various types of input/output and communication devices.

The control unit 21 is a unit which controls the entire anomaly detection device 2, and reads and executes, for example, software (anomaly detection program) stored in the storage unit 22 so as to realize various types of functions in the present embodiment. The control unit 21 may be a CPU. The control unit 21 includes a machining state collection unit 211, a machining execution information recording unit 212, a selection unit 213, an average pattern calculation unit 214, an anomaly detection unit 215 and an output unit 216.

The storage unit 22 is a storage region of various types of programs, various types of data and the like for making a hardware group function as the anomaly detection device 2, and may be a ROM, a RAM, a flash memory, a hard disk drive (HDD) or the like. FIG. 1 is a block diagram showing the functional configuration of the control unit 11. With reference to FIG. 1, the control unit 21 includes the machining state collection unit 211, the machining execution information recording unit 212, the selection unit 213, the average pattern calculation unit 214, the anomaly detection unit 215 and the output unit 216, and thus when these functional units are used to detect a machining anomaly from the machining execution information measured in the machining step of the anomaly detection target, the user can easily grasp a time and/or a portion at which the machining anomaly is detected.

<Machining State Collection Unit 211>

When the numerical controller 1 executes one or more machining steps included in the machining command, the machining state collection unit 211 collects, for example, physical quantities (for example, the spindle load meter value, the spindle torque value, the servo torque values of the individual axes and the servo positions of the individual axes) that are acquired with the sensing means at a predetermined time interval (sampling time) and that indicate the machining state in each of the machining steps together with the acquired time information (sampling time) as the machining execution information of the machining step. The machining state collection unit 111 may further acquire, as the machining execution information, the resource information (for example, the tool number of the tool and the tool usage time of the tool) in each of the machining steps.

<Machining Execution Information Recording Unit 212>

The machining execution information recording unit 212 associates the machining execution information collected with the machining state collection unit 111 in each of the machining steps with, for example, the machining step number of the machining step, and records them in the storage unit 22. Management information indicating, for example, which execution in total is the execution of the machining step may be recorded. Alternatively, information of the date and time on which the machining step is executed may be recorded. The machining execution information recording unit 212 can further associate the tool number of the tool and the usage time of the tool used in each of the machining steps with the machining step number Cn of the machining step and record them in the storage unit 22. Resource usage information which indicates a tool usage state (the tool is in use or not in use) may be recorded as necessary (for example, at each sampling time). In this way, it is possible to record, for example, the cumulative tool usage time of the tool used in the machining step. As will be described later, as the machining execution information, instead of the cumulative tool machining time, for example, cumulative cutting energy, a cumulative actual cutting time, a cutting load, the state of wear of the tool, the number of times the tool is used or the like may be recorded.

FIGS. 4A and 4B are diagrams showing an example of a machining state table in which the machining execution information is recorded. Here, when it is assumed that the machining command includes one or more (N) machining steps Cn ($1 \leq n \leq N$), that one physical quantity at each sampling time Tn(i) ($1 \leq i \leq M$) in each of the machining steps Cn is Dn(i) and that the tool usage state is On(i), as shown in FIG. 4A, the physical quantity Dn(i) indicating the machining state and the resource usage information On(i) indicating the tool usage state which are collected at each sampling time Tn(i) according to the machining step Cn ($1 \leq n \leq N$) can be recorded, for example, in the storage unit 22 in the form of a table.

Furthermore, when the machining command is executed a plurality of times (K times: $1 < K$) (for example, when the machining step is executed once each time the machining command is executed), the machining execution information recording unit 212 can associate K pieces of machining execution information with the same machining step Cn. More specifically, in the machining execution information Cn(j) of the machining step Cn which is collected by executing the machining command the jth time ($1 \leq j \leq K$), as shown in FIG. 4B, one physical quantity at each sampling time Tn(i) ($1 \leq i \leq M$) can be represented by Dn(i,j) and the tool usage state at each sampling time Tn(i) ($1 \leq i \leq M$) can be represented by On(i,j). As described above, when the machining command is executed a plurality of times, the machining step included in the machining command is executed a plurality of times, and each time the machining step is executed, a plurality of pieces of machining execution information related to the machining step are recorded in the storage unit 22 in an order in which they are executed. In this way, in the storage unit 22, a plurality of pieces of machining execution information related to the same machining step are accumulated in the order in which they are executed.

<Selection Unit 213>

In order to detect whether or not an anomaly occurs in the execution of the machining step (analysis target machining step) serving as the anomaly detection target, the anomaly detection device 2 calculates, with the average pattern calculation unit 214 which will be described later, the average pattern which serves as a reference for the evaluation of the machining step. Hence, the selection unit 213 selects, from a set of the pieces of machining execution information related to the machining step recorded in the storage unit 22 in the order in which they are executed, based on a preset filtering condition, a subset of the machining execution information related to the machining step. Specifically, the filtering condition can be set such that as the subset of the machining execution information, for example, a machining condition and/or the machining state when the analysis target machining step is executed, which are similar to each other, are selected. For example, as the filtering condition, a condition in which a predetermined number of pieces of machining execution information related to the machining step that is executed immediately before the analysis target machining step are selected, may be set. As the filtering condition, the range of the cumulative tool time may be set according to the analysis target machining step such that the cumulative tool usage time related to the tool used in each of the machining steps is similar to the state of the tool in the machining of the analysis target machining step. Instead of the range of the cumulative tool usage time, as described above, for example, the filtering condition may be set based on, for example, a cumulative cutting energy amount, the cumulative actual cutting time, the cutting load, the state of wear of the tool, the number of times the tool is used or the like. When the subset of the machining execution information related to the machining step is selected from the set of the pieces of machining execution information related to the machining step recorded in the storage unit 22 in the order in which they are executed, a machining step in which an anomaly is detected may further be removed from the machining steps included in the subset.

Figure 5:
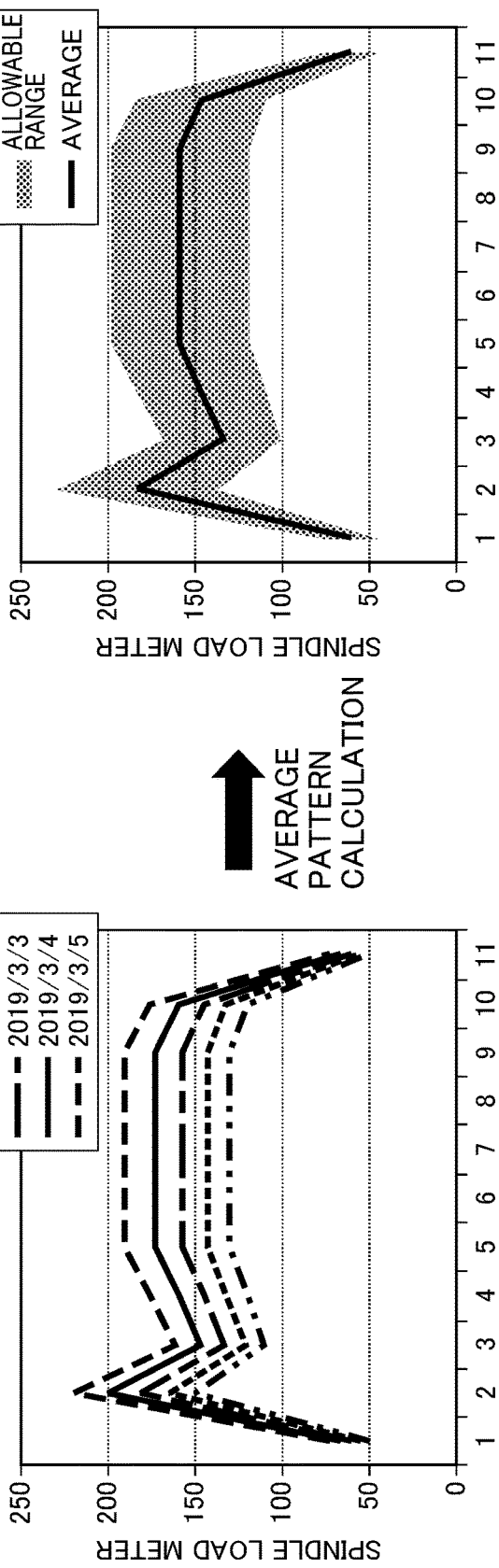
FIG. 5 is a diagram showing an outline of the calculation of an average pattern by utilization of a plurality of physical quantities and machining times in the same machining step in the embodiment.

FIG. 5 is a diagram showing a case where a subset formed with the machining execution information of machining steps which are executed immediately before the analysis target machining step is selected. Here, for example, a case where the machining step is executed once every day is illustrated. For example, when the analysis target machining step is executed (was executed) on Mar. 6, 2019, the filtering condition is set such that the selection unit 213 selects five pieces of machining execution information immediately before the execution of the analysis target machining step (specifically, pieces of machining execution information of machining steps which are executed from March 1 to March 5 and which are recorded in the storage unit 22).

FIG. 6 is a diagram illustrating a case where in machining steps executed immediately before the analysis target machining step, the filtering condition is set such that a subset satisfying a condition in which the cumulative tool usage time falls within a range of 4±3 minutes is selected. In this case, since the cumulative tool usage time is increased each time the machining step is executed, the filtering condition is set such that the cumulative tool usage time is similar to a cumulative tool usage time in the analysis target machining step. As described above, the selection unit 213 can select the subset formed with the appropriate machining execution information based on the preset filtering condition so as to correspond to the analysis target machining step. In this way, in order to detect whether or not an anomaly occurs in the analysis target machining step, the average pattern calculation unit 214 which will be described later can calculate the appropriate average pattern. The filtering condition is set appropriately, and thus the average pattern calculation unit 214 which will be described later can produce the average pattern corresponding to the case. The anomaly detection unit 215 which will be described later can perform comparison accuracy with consideration given to a feature in the machining thereof.

<Average Pattern Calculation Unit 214>

As described above, the average pattern calculation unit 214 calculates, according to the analysis target machining step, based on the subset of the machining execution information selected with the selection unit 213, the average pattern which serves as the reference for detecting whether or not an anomaly occurs when the analysis target machining step is executed. Specifically, the average pattern calculation unit 214 may calculate, from a plurality of pieces of machining execution information selected with the selection unit 213, at each of the same sampling periods in which the machining execution information is collected, the average value of the physical quantities thereof. Then, the average pattern calculation unit 214 may calculate, for the average value calculated at each of the same sampling periods, for example, the average pattern in which a range of plus X percent (X is a preset number) and minus Y percent (Y is a preset number) is set to an allowable range. Specific upper and lower limit values may be set so as to correspond to each sampling period. FIGS. 5 and 6 illustrate the average pattern where an allowable range in which a value obtained by increasing the average value by 25% is set to an upper limit and a value obtained by decreasing the average value by 25% is set to a lower value is set as the allowable range at each sampling period. A method of setting the allowable range is not limited to the example described above. For example, by utilization of dispersion in each sampling period, the range may be set. As another example, based on an arbitrary statistical method, the average pattern (in particular, the allowable range) may be calculated. As described above, the average pattern calculation unit 214 can calculate the appropriate average pattern according to the analysis target machining step. Hence, the anomaly detection unit 215 which will be described later can enhance the accuracy of detection or whether or not an anomaly occurs in the analysis target machining step.

<Anomaly Detection Unit 215>

When the machining command is newly executed with the numerical controller 1, in the analysis target machining step included in the machining command, the anomaly detection unit 215 compares, at each of the same sampling times, the physical quantity collected at the predetermined time interval (sampling time) and the average pattern calculated with the average pattern calculation unit 214 according to the analysis target machining step, and thereby can detect whether or not a separation equal to or greater than a preset predetermined threshold value is made (that is, whether, in the analysis target machining step, the physical quantity collected falls within the allowable range or falls outside the allowable range at each sampling time).

The output unit 216 which will be described later inputs a threshold value, a ratio and a value serving as the allowable range to the average pattern calculated with the average pattern calculation unit 214, and thereby can highlight, as shown in FIGS. 5 and 6, the allowable range of the average pattern as boundaries indicating the occurrence of an anomaly in the analysis target machining step with respect to the physical quantity indicating the machining state at the sampling time in the analysis target machining step. In this way, when an anomaly is detected in the analysis target machining step, the anomaly detection unit 215 can highlight, through the output unit 216 which will be described later, the allowable range such that it is possible to intuitively grasp the fact that the physical quantity exceeds the allowable range on a graph.

<Anomaly Detection Real Time Processing During Machining>

In the execution of the machining command with the numerical controller 1, the anomaly detection unit 215 can detect whether the physical quantity at the sampling time in an arbitrary analysis target machining step collected while the arbitrary analysis target machining step included in the machining command is being executed falls within the allowable range at the sampling time in the average pattern calculated with the average pattern calculation unit 214 according to the analysis target machining step or falls outside the allowable range. In other words, the anomaly detection unit 215 detects whether or not the physical quantity indicating the machining state at the sampling time in the analysis target machining step is separated by the predetermined threshold value or greater at the preset sampling time. When the anomaly detection unit 215 detects the separation, the anomaly detection unit 215 determines that a machining anomaly occurs in the analysis target machining step so as to highlight, through the output unit 216 which will be described later, in real time, a region where the machining anomaly occurs. In this way, it is possible to notify, while the machining command is being executed with the numerical controller 1, the user of a machining anomaly in an arbitrary analysis target machining step included in the machining command. In this way, for example, during the machining, the user can distinguish, in real time, a machining anomaly in the current machining, and stops the machining or lowers a cutting feedrate so as to be able to reduce a load or perform processing such as for the change of the tool as necessary.

<Anomaly Detection Batch Processing After Machining>

After the machining command is executed with the numerical controller 1, the anomaly detection unit 215 can detect whether or not the physical quantity at each sampling time in analysis target machining information collected while an arbitrary analysis target machining step included in the machining command is being executed falls within the allowable range at the sampling time in the average pattern calculated with the average pattern calculation unit 214 according to the analysis target machining step. When the anomaly detection unit 215 detects the separation, the anomaly detection unit 215 determines that a machining anomaly occurs in the analysis target machining step so as to highlight, through the output unit 216 which will be described later, the region exceeding the allowable range, with the result that it is possible to collectively notify the user of locations where anomalies occur in the analysis target machining step after the execution of the machining command. In this way, after the execution of the machining command, for example, the user can confirm that no anomaly occurs in the machining performance or can collectively investigate locations where anomalies occur in the analysis target machining step. In this way, the user can utilize it so as to find a problem in the machining command and to improve the machining command.

<Output Unit 216>

As shown in FIGS. 5 and 6, the output unit 216 displays, for example, on the display 70, the average pattern (that is, the average value and the region of the allowable range) which is calculated with the average pattern calculation unit 214 according to the analysis target machining step. As described above, the threshold value for setting the allowable range is provided by the ratio (% or the like) and the real number (value) or the like. The output unit 216 can produce and superimpose a display on the region of the average pattern which is displayed on the display 70 at each sampling time in the analysis target machining step included in the machining command and which is calculated according to the analysis target machining step. Anomaly detection real time display processing during machining and anomaly detection display processing after machining will be described below.

<Anomaly Detection Real Time Display Processing During Machining>

As described above, the output unit 216 displays, for example, on the display 70, the average pattern (that is, the average value and the region of the allowable range) calculated according to the analysis target machining step while an arbitrary analysis target machining step included in the machining command is being executed. The output unit 216 plots the physical quantity indicating the machining state related to the machining processing at a regular interval (for example, a sampling time). The output unit 216 displays, in real time, whether or not the physical quantity indicating the machining state related to the machining processing falls outside the allowable range in the average pattern calculated according to the analysis target machining step (that is, whether or not a separation equal to or greater than a preset threshold value is made). When the anomaly detection unit 215 detects the separation, the output unit 216 highlights, in real time, a region in which the separation is made. For example, the output unit 216 uses an alarm to the user, highlighting such as by change of the color of a graph, sound, the forced stop of the machine or the like so as to be able to notify the user of a machining anomaly.

Figure 7A:
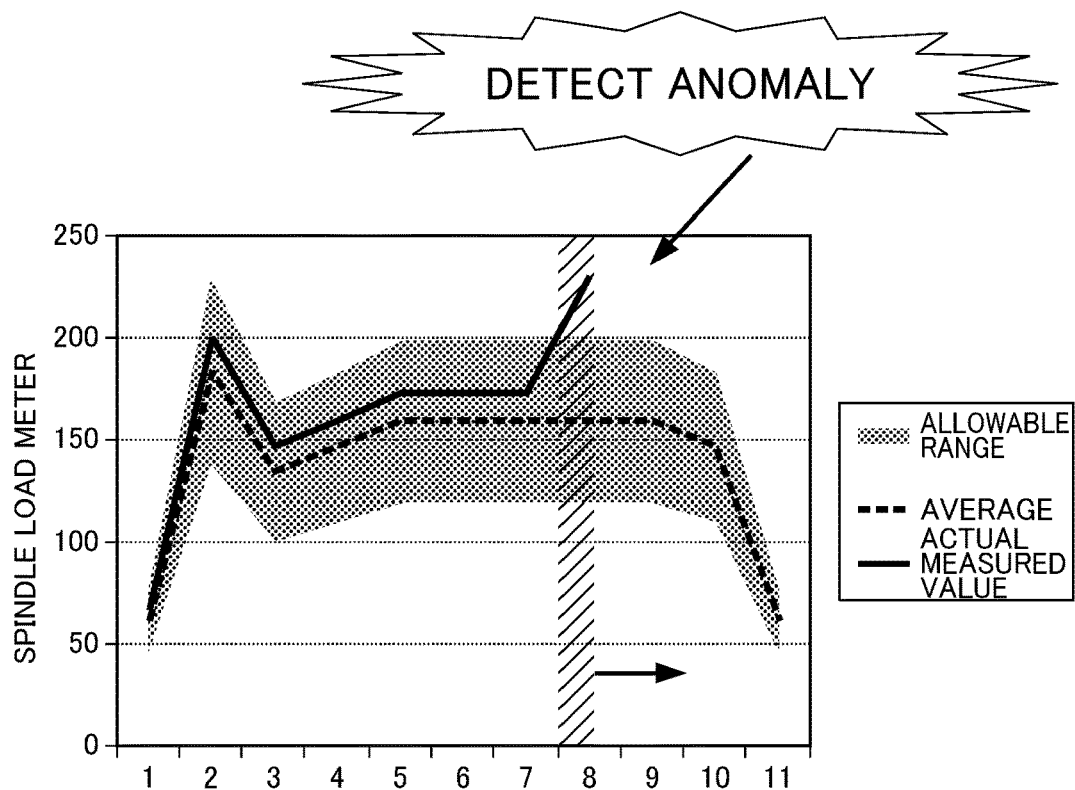
FIG. 7A is a diagram showing an example where whether or not an anomaly occurs in a machining step during machining is detected and where the result of the detection is displayed in real time on a graph.

FIG. 7A is a diagram showing an example where when a separation on the spindle load meter value is detected with the anomaly detection unit 215 while an arbitrary analysis target machining step is being executed, a region separated in real time is identified and displayed on the display 70. As shown in FIG. 7A, the physical quantity indicating the current machining state is plotted at a sampling time each time a fixed time elapses on the average pattern calculated according to the analysis target machining step displayed on the display 70 and the allowable range thereof. Here, a threshold value indicating the allowable range at each sampling time may be provided by, for example, a ratio (% or the like) with respect to the average value at each sampling time and a real number (value). Then, when as shown in FIG. 7A, the physical quantity falls outside the allowable range, a region outside the allowable range is highlighted in real time, and thus the user can easily recognize the occurrence of a machining anomaly in the current machining (that is, the analysis target machining step). In this way, for example, during the machining, the user can stop machining during the machining in real time or lower the cutting feedrate in real time so as to be able to reduce a load or perform processing such as for the change of the tool as necessary.

Although as an example where the output unit 216 notes the user of the occurrence of a machining anomaly when the physical quantity falls outside the allowable range described above, the case where the region outside the allowable range is highlighted on the display 70 is illustrated, there is no limitation thereto. For example, the output unit 216 may use an alarm to the user, highlighting such as by change of the color of the graph, sound, the forced stop of the machine or the like so as to notify the user of the occurrence of a machining anomaly.

<Anomaly Detection Display Processing After Machining

As described above, after the machining command is executed with the numerical controller 1, the anomaly detection unit 215 can detect whether or not the physical quantity indicating the machining state related to the machining processing at all sampling times in an arbitrary analysis target machining step included in the machining command falls within the allowable range at the sampling time in the average pattern calculated according to the analysis target machining step. When the anomaly detection unit 215 detects the separation, the output unit 216 highlights the region exceeding the allowable range in the analysis target machining step so as to be able to collectively notify the user of locations where anomalies occur in an arbitrary analysis target machining step after the execution of the machining command.

Figure 7B:
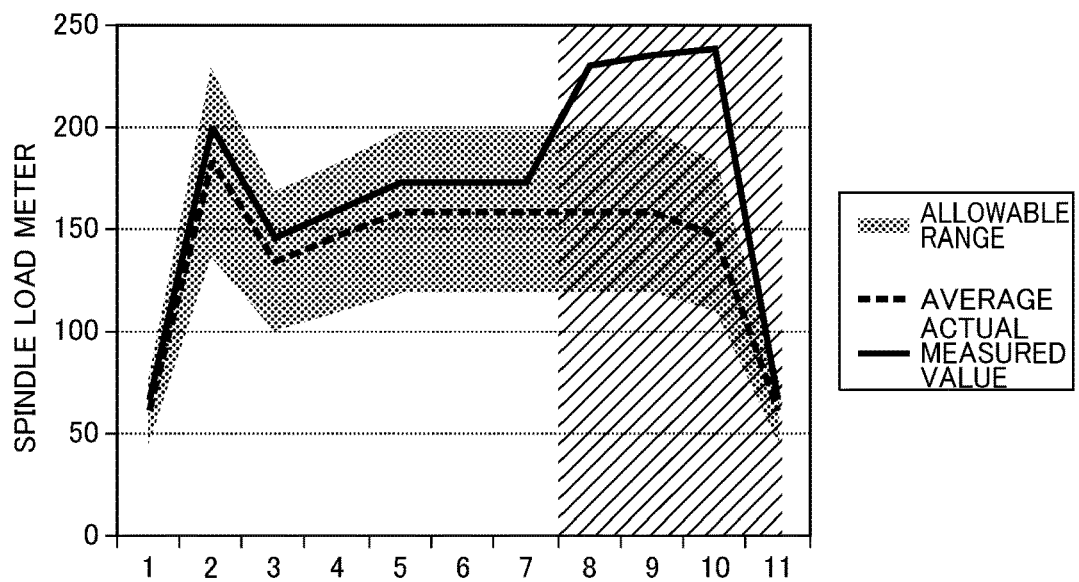
FIG. 7B is a diagram showing an example where an analysis as to whether or not an anomaly occurs in the machining step after the machining is displayed in real time on a graph.

FIG. 7B is a diagram showing an example where a region in which a separation on the spindle load meter value is detected with the anomaly detection unit 215 after an arbitrary analysis target machining step is executed is identified and displayed on the display 70. As shown in FIG. 7B, after an arbitrary analysis target machining step is executed, the physical quantity indicating the machining state from the start of the machining step until the completion thereof is plotted, each time a fixed time elapses (for example, a sampling time), on the average pattern displayed on the display 70 and calculated according to the arbitrary analysis target machining step and the allowable range thereof. Here, the threshold value indicating the allowable range at each sampling time may be provided, as described above, for example, by the ratio (% or the like) with respect to the average value at each sampling time and the real number (value). The output unit 216 collectively highlights, for the user, a region where the physical quantity indicating the machining state from the start of the machining step until the completion of the machining step in each of arbitrary analysis target machining steps when the machining command is executed exceeds the allowable range. Specifically, for example, when the physical quantity falls outside the allowable range, highlighting such as the change of the color of a graph may be performed. In this way, it is possible to perform an investigation and analysis so as to traverse the region where the physical quantity indicating the machining state in an arbitrary analysis target machining step exceeds the allowable range. Thus, for example, it is possible to utilize it so as to find a problem on the machining processing and to improve the machining command.

Figure 8:
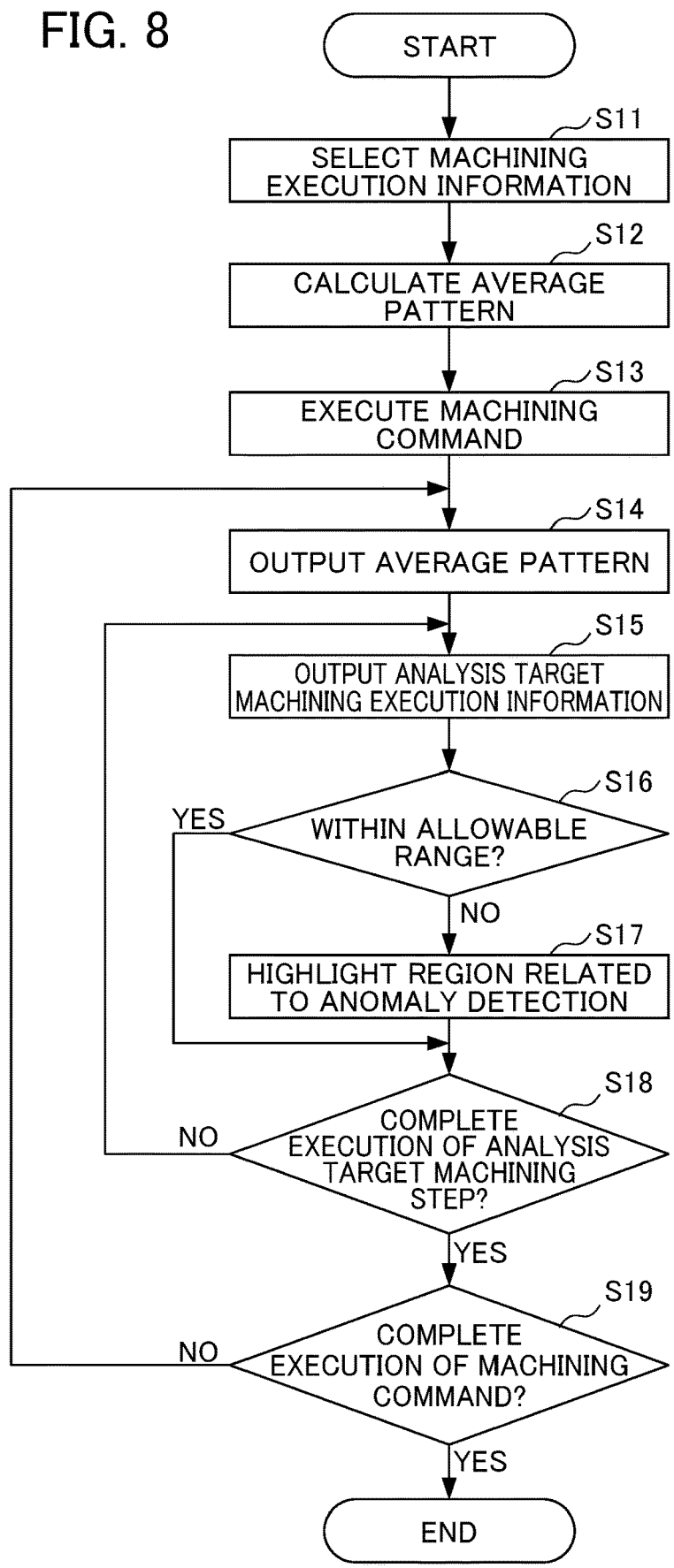
FIG. 8 is a flowchart showing an operation of the anomaly detection device when whether or not an anomaly occurs in a machining step while the machining step included in a machining command is being executed is detected and the result of the detection is displayed in real time on a graph.
Figure 9:
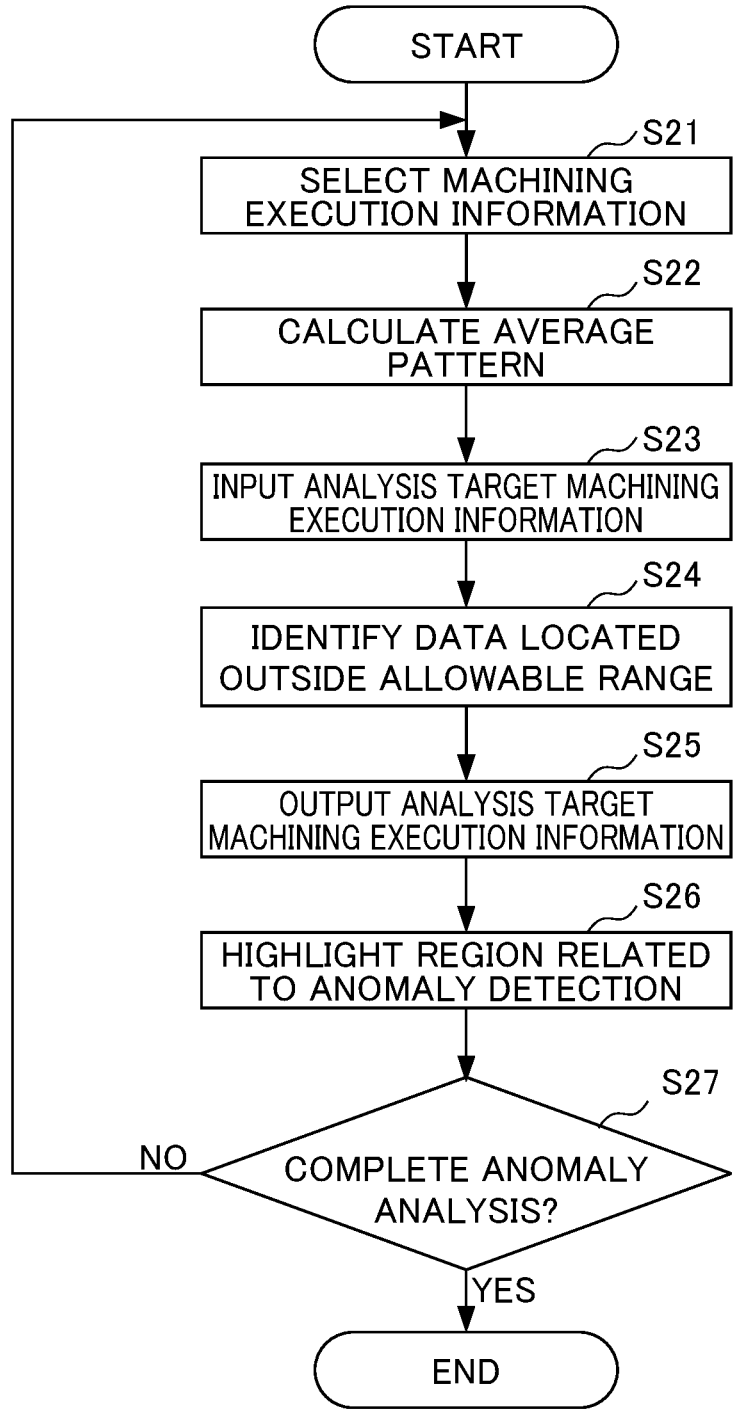
FIG. 9 is a flowchart showing an operation of the anomaly detection device when after the execution of the machining command, a performance analysis as to whether or not an anomaly occurs in each of the machining steps included in the machining command is performed.

The configurations of the individual functional units of the numerical controller 1 according to a first embodiment illustrated as the present embodiment have been described above. An operation of the anomaly detection device 2 related to the anomaly detection processing will next be described. FIG. 8 is a flowchart showing an operation of detecting, in real time, an anomaly in the machining step while an arbitrary analysis target machining step serving as the anomaly detection target is being executed. FIG. 9 is a flowchart showing an operation of performing, after the completion of the execution of the machining command, an anomaly detection inspection from the start of an arbitrary analysis target machining step serving as the anomaly detection target until the completion thereof. In the following operation description, machining execution information related to the machining step which is executed before the analysis target machining step is assumed to be recorded in the storage unit 22 with the machining execution information recording unit 212.

With reference to the flowchart of FIG. 8, a description will first be given of a processing flow which detects, in real time, while an arbitrary analysis target machining step (hereinafter also referred to as "Cn_target") serving as the anomaly detection target and included in the machining command is being executed, an anomaly in the machining step. In step S11, in order to calculate the average pattern (hereinafter also referred to as "Cn_average") in the analysis target machining step Cn_target when the machining is executed with the numerical controller 1, the anomaly detection device 2 (the selection unit 213) selects, based on the preset filtering condition, a subset of machining execution information from a set of a plurality of pieces of machining execution information related to the machining step recorded in the storage unit 22.

In step S12, the anomaly detection device 2 (the average pattern calculation unit 214) calculates, based on the subset of the machining execution information which is selected, the average pattern Cn_average suitable for the analysis target machining step Cn_target. Specifically, the average pattern calculation unit 214 calculates, based on the subset of the selected machining execution information, a statistical amount (for example, the average value and the allowable range) related to the physical quantity at each of the same sampling times T(i) for the analysis target machining step Cn_target so as to produce the average pattern Cn_average in the analysis target machining step Cn_target.

In step S13, the numerical controller 1 starts the execution of the machining command.

In step S14, when the execution of the analysis target machining step Cn_target is started, the anomaly detection device 2 (the output unit 216) previously outputs, for example, as shown in FIG. 7A, the average pattern Cn_average (i) in the analysis target machining step Cn_target and the region (allowable range) of the threshold value in the order of the sampling times T(i).

In step S15, the anomaly detection device 2 (the machining state collection unit 211) collects the physical quantity (hereinafter referred to as "analysis target machining execution information Cn_target (i)") indicating the machining state at the sampling time T(i) in the analysis target machining step Cn_target and records it in the storage unit 22, and the anomaly detection device 2 (the output unit 216) outputs the analysis target machining execution information Cn_target (i) acquired with the machining state collection unit 211 at each of the sampling times T(i) in the analysis target machining step Cn_target.

In step S16, the anomaly detection device 2 (the anomaly detection unit 215) detects whether or not Cn_target (i) falls within the allowable range at the sampling time T(i). Specifically, the anomaly detection device 2 (the anomaly detection unit 215) determines whether or not Cn_target (i) falls within the allowable range in the average pattern Cn_target (i). When Cn_target (i) falls within the allowable range (in the case of yes), the process is transferred to step S18. When Cn_target (i) does not fall within the allowable range (in the case of no), the process is transferred to step S17.

In step S17, the anomaly detection device 2 (the output unit 216) highlights and outputs a region related to the sampling time T(i). Specifically, for example, as shown in FIG. 7A, the region may be highlighted on the display 70.

In step S18, the control unit 11 determines whether or not the execution of the analysis target machining step Cn_target is completed. When the execution of the analysis target machining step Cn_target is not completed (in the case of no), the process is transferred to step S15. When the execution of the analysis target machining step Cn_target (i) is completed (in the case of yes), the process is transferred to step S19.

In step S19, the anomaly detection device 2 determines whether or not the execution of the machining command is completed. When the execution of the machining command is not completed (in the case of no), the process is transferred to step S14. When the execution of the machining command is completed (in the case of yes), the process is completed. In the above description, the order of the steps is an example, and there is no limitation thereto. For example, the calculation of the average pattern Cn_average (i) suitable for the analysis target machining step Cr_target may be performed when the execution of the analysis target machining step Cn_target is started in step S14. After step S17, the anomaly detection device 2 may receive an instruction from the user to stop the machining step or to perform processing such as for lowering the cutting feedrate.

In this way, as shown in FIG. 7A, when the physical quantity falls outside the allowable range, the region outside the allowable range can be highlighted in real time. Thus, the user can easily recognize the occurrence of a machining anomaly in the current machining step. In order to cope with the occurrence of a machining anomaly, for example, the user can stop the machining step, perform processing such as for the change of the tool as necessary or reduce a load such as by lowering the cutting feedrate.

With reference to the flowchart of FIG. 9, the processing of an anomaly detection functional unit when a performance analysis is performed after the machining command is executed will next be described. Before the following processing is performed, the machining execution information of the analysis target machining step Cn_target and the machining execution information which is executed before the analysis target machining step Cn_target and which is related to the machining step Cn are assumed to be recorded in the storage unit 22.

With reference to FIG. 9, in step S21, when a machining anomaly investigation in the machining step Cn included in the machining command is executed, the anomaly detection device 2 (the selection unit 213) selects, based on the preset filtering condition, the subset of the machining execution information from the set of a plurality of pieces of machining execution information which is recorded in the storage unit 22 in order to calculate the average pattern Cn_average in the analysis target machining step Cn_target and which is related to the machining step Cn executed before the analysis target machining step Cn_target.

In step S22, the anomaly detection device 2 (the average pattern calculation unit 214) calculates the average pattern Cn_average (i) suitable for the analysis target machining step Cn_target based on the subset of the machining execution information which is selected.

In step S23, the anomaly detection device 2 (the anomaly detection unit 215) inputs (acquires) the analysis target machining execution information Cn_target (i) in the analysis target machining step Cn_target from the storage unit 22.

In step S24, the anomaly detection device 2 (the anomaly detection unit 215) determines a subset of i [i: outside the allowable range] in which Cn_target (i) is located outside the region of the allowable range of the average pattern Cn_target (i).

In step S25, as shown in FIG. 7B, the anomaly detection device 2 (the output unit 216) outputs the range region (range region of the average value and the threshold value (upper and lower limits) of the average pattern Cn_target (i) in the analysis target machining step Cr_target, and outputs Cn_target (i).

In step S26, the anomaly detection device 2 (the output unit 216) further highlights the region of [i: outside the allowable range] as shown in FIG. 7B, and outputs it. When [i: outside the allowable range] is an empty set, an output of no anomaly may be produced. The anomaly detection device 2 (the output unit 216) may produce an output as a file. When an output is produced as a file, an output may be produced to the display 70 or the like by a reference program for referencing a file.

In step S27, the anomaly detection device 2 determines whether or not the anomaly detection processing of all the analysis target machining steps Cn_target included in the machining command is completed. When the processing is not completed (in the case of no), the process is transferred to step S21. When the processing is completed (in the case of yes), the process is completed. In this way, as shown in FIG. 7B, it is possible to collectively hid blight, for the user, the region in which the physical quantity (the analysis target machining execution information Cn_target (i)) indicating the machining state from the start of the analysis target machining step Cn_target included in the machining command after the machining command is executed until the completion thereof exceeds the allowable range. Thus, for example, it is possible to utilize it so as to find a problem on the machining processing and to improve the machining command. The operation of the anomaly detection device 2 has been described above.

Individual constituent units included in the anomaly detection device 2 can be realized by hardware (including an electronic circuit and the like), software or a combination thereof. When they are realized by software, the programs of the software are installed into a computer (the numerical controller 1). These programs may be distributed to users by being recorded in removable media or may be distributed by being downloaded through a network into computers of users. When they are realized by hardware, part or all of the functions of the constituent units included in the controller can be formed with, for example, an integrated circuit (IC) such as an ASIC (Application Specific Integrated Circuit), a gate array, an FPGA (Field Programmable Gate Array) or a CPLD (Complex Programmable Logic Device.

Although the embodiment of the present invention has been described above, the present invention is not limited to the embodiment described above. The effects described in the present embodiment are simply a list of most preferred effects produced from the present invention, and the effects of the present invention is not limited to those described in the present embodiment.

[Variation 1]

In the embodiment described above, the configuration is illustrated in which the anomaly detection device 2 includes all the functional units related to the anomaly detection functions. In this case, as described above, the anomaly detection device 2 may be directly connected to the numerical controller 1 through the interface portion (not shown). The anomaly detection device 2 may be a server (anomaly detection server) which is connected through a network to the numerical controller 1 so as to communicate therewith. For example, the anomaly detection device 2 may be an edge server which is connected to individual machines (edges) so as to be able to communicate therewith. The anomaly detection device 2 may be realized as a virtual server on a cloud. The functional units of the anomaly detection device 2 may be provided as functions on a cloud. The anomaly detection device 2 may be included in the numerical controller 1. The functional block included in the anomaly detection device 2 may be included in the numerical controller 1. The numerical controller 1 may include some functional units related to the anomaly detection functions (the machining state collection unit, the machining execution information recording unit, the selection unit, the average pattern calculation unit, the anomaly detection unit and the output unit) included in the anomaly detection device 2. In this case, the numerical controller 1 and the anomaly detection device 2 including the remaining functional units may be directly connected through the interface portion (not shown) as described above. They may be connected through a network so as to be able to communicate to each other.

[Variation 2]

Although in the embodiment described above, the average pattern calculation unit 214 illustrates, as the allowable range at each sampling time, for example, the average pattern in which the upper limit threshold value is the average value plus 25% and the lower limit threshold value is the average value minus 25% and which is produced in proportion to the average value, there is no limitation thereto. For example, the threshold value of the allowable range may be set according to the dispersion of the physical quantity at each sampling time.

<Effects of Present Embodiment>

According to the present embodiment, for example, the following functional effects can be obtained.

(1) The anomaly detection device 2 includes, in order to detect an anomaly in the machining command which is executed in the controller 1 and which is formed with one or more machining steps: the machining state collection unit 211 which collects, as machining execution information of the machining step, a physical quantity that is acquired at a predetermined time interval when the machining command is executed and that indicates a machining state in the machining step together with information of a time at which the physical quantity is acquired; the machining execution information recording unit 212 which records, in the storage unit 22, the machining execution information collected with the machining state collection unit 211; the selection unit 213 which executes, on an arbitrary one of the machining steps, the same machining step as the machining step a plurality of times and which selects, from a set of machining execution information of the same machining step as the machining step recorded a plurality of times in the storage unit 22, a subset of the machining execution information of the same machining step as the machining step that is suitable for calculation of an average pattern which is an average time change in the physical quantity of machining execution information of the arbitrary one of the machining steps; an average pattern calculation unit 214 which calculates the average pattern of the machining execution information of the arbitrary one of the machining steps based on the subset of the machining execution information selected with the selection unit 213; and an anomaly detection unit 215 which compares target machining execution information that is acquired by execution of the arbitrary one of the machining steps and that is the machining execution information of the machining step with the average pattern calculated with the average pattern calculation unit 214 so as to detect an anomaly when the arbitrary one of the machining steps is executed. In this way, for example, when the same machining step is performed individually and repeatedly on a plurality of work pieces, it is possible to easily distinguish, by a method suitable for each of machining states, whether or not a machining anomaly occurs in each of the machining steps.

(2) Preferably, in the anomaly detection device 2 described in (1), the anomaly detection unit 215 compares the target machining execution information with the average pattern so as to detect an anomaly in the arbitrary one of the machining steps based on detection of whether or not a separation equal to or greater than a preset threshold value is made. In this way, for example, when the same machining step is performed individually and repeatedly on a plurality of work pieces, the threshold value is previously set, and thus it is possible to easily distinguish whether or not a machining anomaly occurs in each of the machining steps.

(3) Preferably, the anomaly detection device 2 described in (1) or (2) includes: an output unit 216 that identifies, when the anomaly detection unit 215 detects an anomaly in the arbitrary one of the machining steps, a physical quantity in which the anomaly is detected and a time at which the physical quantity is acquired as an anomaly occurrence region. In this way, for example, when the same machining step performed individually and repeatedly on a plurality of work pieces, it is possible to easily recognize whether or not a machining anomaly occurs in each of the machining steps together with the physical quantity and the time at that time.

(4) Preferably, in the anomaly detection device 2 described in any one of (1) to (3), machining execution information which is collected with the machining state collection unit 211 while the arbitrary one of the machining steps is being executed is set to the target machining execution information. In this way, whether or not a machining anomaly occurs can be distinguished in real time during the machining, and it is possible to provide a notification to the user and to stop the machining.

(5) Preferably, in the anomaly detection device 2 described in any one of (1) to (3), machining execution information which is collected with the machining state collection unit 211 after the arbitrary one of the machining steps is executed is set to the target machining execution information. In this way, for example, by batch processing after the machining, it is possible to investigate locations where anomalies occur in the machining, and thus it is possible to utilize it so as to find a problem and to improve the machining command.

(6) Preferably, in the anomaly detection device 2 described in any one of (1) to (5), the machining state collection unit 211 further collects a tool cumulative usage time of a tool used in the machining step, the machining execution information recording unit 212 further makes the tool cumulative usage time of the tool used in the machining step correspond to the machining execution information of the machining step and records the tool cumulative usage time and the machining execution information in the storage unit 22 and the selection unit 213 further selects, among the machining steps recorded in the storage unit 22 a plurality of times, machining execution information of the machining step in which the tool cumulative usage time falls within a preset specified range. In this way, when the average pattern is produced, for example, a machining step in which a tool usage state in the arbitrary one of the machining steps is similar thereto is selected, and thus it is possible to calculate the average pattern.

(7) Preferably, an anomaly detection server includes: the anomaly detection device 2 described in any one of (1) to (6), and the anomaly detection server is connected to the controller 1 so as to communicate therewith. In this way, the anomaly detection server is connected to the numerical controller 1, for example, through a high-speed, low-delay network such as 5G, and thus, for example, with a service provided on a cloud, it is possible to easily detect whether or not a machining anomaly occurs when the machining command is executed.

(8) An anomaly detection method executed by a computer includes, in order to detect an anomaly in a machining command that is executed in a controller 1 and that is formed with one or more machining steps: a machining state collection step of collecting, as machining execution information of the machining step, a physical quantity that is acquired at a predetermined time interval when the machining command is executed and that indicates a machining state in the machining step together with information of a time at which the physical quantity is acquired; a machining execution information recording step of recording, in a storage unit 22, the machining execution information collected in the machining state collection step; a selection step of executing, on an arbitrary one of the machining steps, the same machining step as the machining step a plurality of times and selecting, from a set of machining execution information of the same machining step as the machining step recorded a plurality of times in the storage unit 22, a subset of the machining execution information of the same machining step as the machining step that is suitable for calculation of an average pattern which is an average time change in the physical quantity of machining execution information of the arbitrary one of the machining steps; an average pattern calculation step of calculating the average pattern of the machining execution information of the arbitrary one of the machining steps based on the subset of the machining execution information selected in the selection step; and an anomaly detection step of comparing target machining execution information that is acquired by execution of the arbitrary one of the machining steps and that is the machining execution information of the machining step with the average pattern calculated in the average pattern calculation step so as to detect an anomaly when the arbitrary one of the machining steps is executed. In this way, it is possible to achieve the same effect as (1).

EXPLANATION OF REFERENCE NUMERALS

1 numerical controller
2 anomaly detection device
21 control unit
22 storage unit
211 machining state collection unit
212 machining execution information recording unit
213 selection unit
214 average pattern calculation unit
215 anomaly detection unit
216 output unit

What is claimed is:

1. An anomaly detection device comprising, in order to detect an anomaly in a machining command which is executed in a controller and which is formed with one or a plurality of machining steps that are units for machining one type of machining shape with one type of tool:

a machining state collection unit which collects, as machining execution information of the machining step, a physical quantity that is acquired at a predetermined time interval when the machining command is executed and that indicates a machining state in the machining step together with information of a time at which the physical quantity is acquired;

a machining execution information recording unit which records, in a storage unit, the machining execution information collected with the machining state collection unit;

a selection unit which executes, on an arbitrary one of the machining steps, a same machining step as the machining step a plurality of times and which selects, from a set of machining execution information of the same machining step as the machining step recorded a plurality of times in the storage unit, a subset of the machining execution information of the same machining step as the machining step that is suitable for calculation of an average pattern which is an average time change in the physical quantity of machining execution information of the arbitrary one of the machining steps in the following manner: at least one machining execution information of a range of a cumulative tool usage time, a cumulative cutting energy amount, a cumulative actual cutting time, a state of wear of the tool, or a number of times the tool is used, related to the tool used in the machining step, is collected by the machining state collection unit the machining execution information is recorded in the storage unit by the machining execution information recording unit and the subset of the machining execution information is selected based on a filtering condition preset with a condition including the machining execution information;

an average pattern calculation unit which calculates the average pattern of the machining execution information of the arbitrary one of the machining steps based on the subset of the machining execution information selected with the selection unit; and an anomaly detection unit which compares target machining execution information that is acquired by execution of the arbitrary one of the machining steps and that is the machining execution information of the machining step with the average pattern calculated with the average pattern calculation unit so as to detect an anomaly when the arbitrary one of the machining steps is executed.

2. The anomaly detection device according to claim 1, wherein the anomaly detection unit compares the target machining execution information with the average pattern so as to detect an anomaly in the arbitrary one of the machining steps based on detection of whether or not a separation equal to or greater than a preset threshold value is made.

3. The anomaly detection device according to claim 1, comprising: an output unit that identifies, when the anomaly detection unit detects an anomaly in the arbitrary one of the machining steps, a physical quantity in which the anomaly is detected and a time at which the physical quantity is acquired as an anomaly occurrence region.

4. The anomaly detection device according to claim 1, wherein machining execution information which is collected with the machining state collection unit while the arbitrary one of the machining steps is being executed is set to the target machining execution information.

5. The anomaly detection device according to claim 1, wherein machining execution information which is collected with the machining state collection unit after the arbitrary one of the machining steps is executed is set to the target machining execution information.

6. An anomaly detection server comprising: the anomaly detection device according to claim 1, wherein the anomaly detection server is connected to the controller so as to communicate therewith.

7. An anomaly detection method by which a computer executes, in order to detect an anomaly in a machining command that is executed in a controller and that is formed with one or a plurality of machining steps that are units for machining one type of machining shape with one type of tool:

a machining state collection step of collecting, as machining execution information of the machining step, a physical quantity that is acquired at a predetermined time interval when the machining command is executed and that indicates a machining state in the machining step together with information of a time at which the physical quantity is acquired;

a machining execution information recording step of recording, in a storage unit, the machining execution information collected in the machining state collection step;

a selection step of executing, on an arbitrary one of the machining steps, a same machining step as the machining step a plurality of times and selecting, from a set of machining execution information of the same machining step as the machining step recorded a plurality of times in the storage unit a subset of the machining execution information of the same machining step as the machining step that is suitable for calculation of an average pattern which is an average time change in the physical quantity of machining execution information of the arbitrary one of the machining steps in the following manner: at least one machining execution information of a range of a cumulative tool usage time, a cumulative cutting energy amount, a cumulative actual cutting time, a state of wear of the tool, or a number of times the tool is used, related to the tool used in the machining step, is collected by the machining state collection step; the machining execution information is recorded in the storage unit by the machining execution information recording step; and the subset of the machining execution information is selected based on a filtering condition preset with a condition including the machining execution information;

an average pattern calculation step of calculating the average pattern of the machining execution information of the arbitrary one of the machining steps based on the subset of the machining execution information selected in the selection step; and an anomaly detection step of comparing target machining execution information that is acquired by execution of the arbitrary one of the machining steps and that is the machining execution information of the machining step with the average pattern calculated in the average pattern calculation step so as to detect an anomaly when the arbitrary one of the machining steps is executed.

* * * * *